3,030,301
CATALYTIC REFORMING
Peter Thomas White and Denis Sidney Ward, Sunbury-on-Thames, England (both of Britannic House, Finsbury Circus, London E.C. 2, England)
Filed Oct. 30, 1958, Ser. No. 768,020
Claims priority, application Great Britain Oct. 30, 1957
8 Claims. (Cl. 208—140)

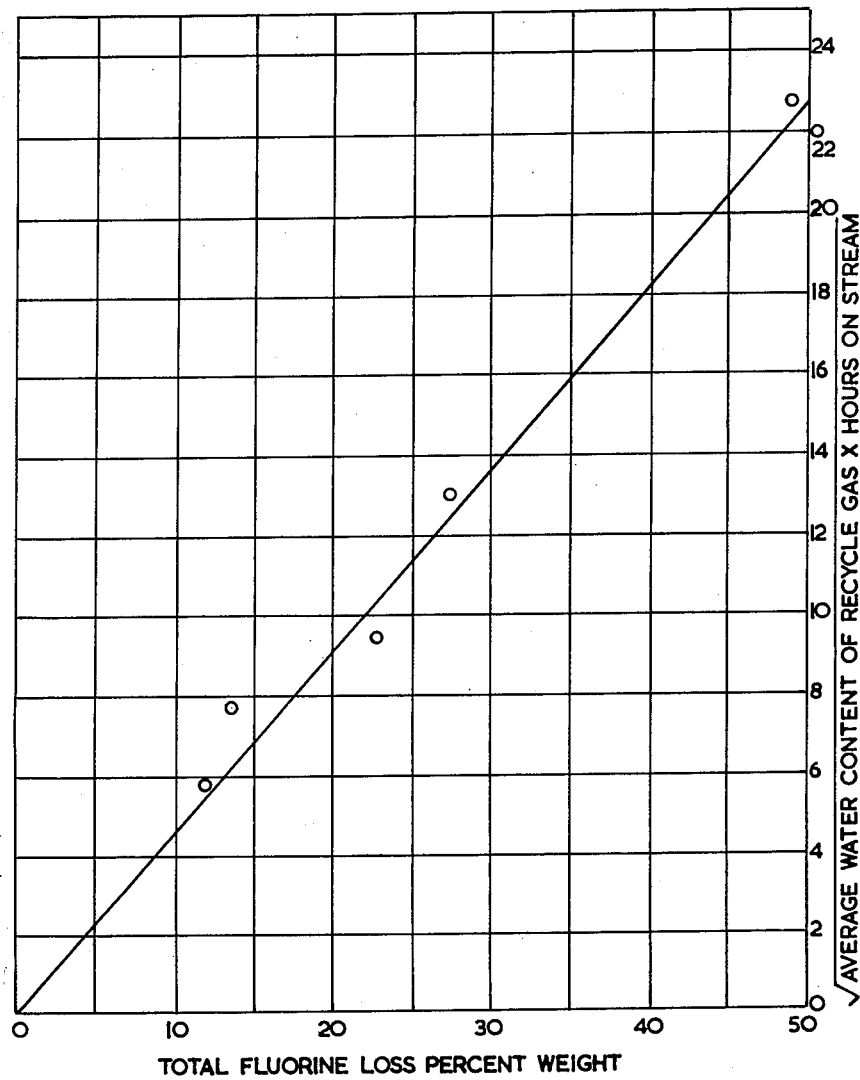

This invention relates to the catalytic reforming process according to which petroleum naphtha fractions of low aromatic content and low octane number are contacted in the presence of hydrogen and at elevated temperature and pressure with a catalyst for the various chemical reactions which contribute to the production of aromatics and isomers whereby a product of increased octane number as compared with the feed stock is obtained.

A number of such processes that have been extensively developed commercially use catalysts consisting of a small amount of platinum supported on a base consisting essentially of alumina. The catalysts may also contain a small amount of halogen, particularly fluorine and/or chlorine. The present invention is concerned with catalytic reforming processes using such halogenated catalysts.

An important advantage of such platinum-alumina-halogen catalysts is that they may be used for lengthy periods before replacement or regeneration is necessary. Treatment of the catalyst for the removal of carbonaceous deposits does not necessarily restore its activity to the same level as fresh catalyst although some improvement is achieved. One cause of reduced activity is loss of halogen during processing and it has previously been proposed in connection with a hydro-forming process using a fluidised bed of catalyst of the kind described above, to add to the catalyst, after it has been treated for the removal of carbonaceous deposits, a volatile fluoride in an amount corresponding to that lost by volatilisation. It has also been proposed in connection with a hydroforming process using a fixed bed of catalyst of the kind described above, to introduce into the reaction zone during the process period a halogen or halogen compound reactable with alumina under the reaction conditions, in such an amount that the hydrocracking activity of the catalyst is increased.

It has now been found that, in a fixed bed process, provided that halogen is not introduced into the reaction zone during processing, the amount of fluorine lost during processing can be calculated directly from a consideration of the process conditions. Once this amount is known, the fluorine content can be adjusted by the addition between processing periods of fluorine or a fluorine compound reactable with the alumina of the catalyst in the quantity necessary to restore the fluorine content of the catalyst to any given value. In this way, accurate knowledge of and control over the fluorine content of the catalyst can be maintained without the necessity of removing the catalyst from the reactor.

Accordingly, one aspect of the present invention is a method of determining the amount of fluorine lost from a catalyst containing platinum, alumina and combined fluorine, during a catalytic reforming process in which halogen is not added during processing, comprising determining the average water content of the recycle gas and the hours on stream, and calculating the fluorine loss according to the equation $$\text{Fluorine loss (percent wt.)} = 2.22 \times \sqrt{\begin{array}{c}\text{Average percent molar} \\ \text{water content of recycle} \\ \text{gas} \times \text{hours on stream.}\end{array}}$$

In a further aspect, the present invention utilises the aforesaid method to adjust the fluorine content of a catalyst and the invention includes a process for the adjustment of the fluorine content of a catalytic reforming catalyst containing platinum, alumina and combined halogen in situ in a reactor, comprising determining the average water content of the recycle gas and the hours on stream during a processing period in which halogen has not been added, calculating the fluorine loss during processing according to the equation $$\text{Fluorine loss (percent wt.)} = 2.22 \times \sqrt{\begin{array}{c}\text{Average percent molar} \\ \text{water content of recycle} \\ \text{gas} \times \text{hours on stream.}\end{array}}$$

and thereafter introducing into the reactor between processing periods fluorine or a fluorine compound reactable with the alumina of the catalyst in the quantity necessary to restore the fluorine content of the catalyst to a given value.

It will be appreciated that the equation given above can also be expressed graphically as indicated by the accompanying diagram.

The relationship expressed by the equation has been found to apply only to fluorine. In the cases where catalysts containing chlorine in addition to fluorine have been used, no direct correlation between the process conditions used and loss of chlorine has been found. However, the chlorine content of a catalyst is not so critical and it is believed that most of the chlorine content of a catalyst is, in any case, lost in the first few hours of a processing period. Accordingly, an estimate of the chlorine loss is normally adequate and according to a further feature of the present invention it has been found that replacement of fluorine in excess of that lost will compensate for the loss of chlorine, which can then be disregarded. Although this is a preferred method, it is also possible, if desired, to restore chlorine to the catalyst according to the estimated loss simultaneously with replacement of fluorine.

It is to be understood that the present invention is not restricted to replacing the exact amount of fluorine lost. Besides introducing additional fluorine above that lost to compensate for loss of chlorine, fluorine in excess of or, if desired, fluorine below that lost may be added if a variation in the hydrocracking activity of the catalyst is desired as compared to the previous processing period. The precise quantity of fluorine introduced, if different from the amount lost, will depend on the original halogen content of the catalyst which will normally be known and the desired variation in catalyst activity. The catalyst activity can be determined by simple tests and a convenient test is the activity test described in the example. One known type of catalyst consists of platinum, alumina and 0.1 to 8% of combined halogen by weight of the alumina. Preferably this type of catalyst contains 0.1 to 3% of fluorine, so that the quantity of fluorine introduced may conveniently be such as to give a catalyst having fluorine within the range 0.1 to 8% and preferably within the range 0.1 to 3%.

Besides the loss of fluorine during processing, there is normally a gradual deposition of carbonaceous deposits on the catalyst. The present invention may therefore conveniently be combined with a regeneration process for the removal of carbonaceous deposits and the adjustment of the fluorine content may be carried out before or after treatment of the catalyst for the removal of carbonaceous deposits. Such treatment may conveniently be effected under the following conditions:

Regeneration gas _____ Once through air/nitrogen (1% to 4% volume of oxygen).
Space velocity _____ 900 v./v./hr. calculated at STP.
Pressure _____ Atmospheric
Temperature _____ 700° F. inlet to 900° F. max.

The particular method used for introducing fluorine or a fluorine compound into the reactor between processing periods should be one in which substantially all the fluorine introduced reacts with the alumina so that there is reasonable control over the replacement of the fluorine. Preferably, the fluorine is introduced as an organic fluorine compound under conditions in which the compound is volatilised and dissociated in the reactor. Thus one particularly preferred method comprises dissolving an organic fluorine compound in a liquid hydrocarbon fraction boiling within the gasoline or naphtha range, for example the naphtha used as feedstock in the catalytic reforming process, and feeding the fraction into the reactor which is at elevated temperature, under conditions such that there is no volatilisation of the fluorine compound before its entry into the reactor. For example, an organic fluorine compound may be dissolved in cold naphtha and passed, without any preliminary heating, to a reactor maintained at about 800–900° F. The reactor is preferably also maintained under a hydrogen pressure of about 500 p.si.g. using once-through hydrogen and the rate of feed of the naphtha may be such that the required amount of organic fluorine compound is added over a two-hour period. If a hydrocarbon carrier is used to introduce the organic fluorine compound into the heated reactor, regeneration of the catalyst is preferably carried out after the introduction, since the method of introduction may itself result in some deposition of carbonaceous material on the catalyst.

Examples of suitable organic fluorine compounds are tert-butyl fluoride and benzo-trifluoride. If chlorine is to be introduced simultaneously with fluorine, dichlorodifluoromethane or a mixture of tert-butyl fluoride and tert-butyl chloride may be used.

Although the invention has been described with reference to a single reactor, the invention is applicable to catalytic reforming processes using several reactors in series, the loss of fluorine during processing then being the loss from all the reactors. Since it is known that the greatest loss of fluorine occurs from the first reactor of a series, the introduction of fresh fluorine in units without swing-reactors should preferably be such as to re-introduce the greatest quantity of fluorine into the first reactor, for example by introducing the fluorine by passing it in series through the reactors in the same direction as the normal flow of feed during processing. In units having a swing-reactor in which each reactor is regenerated in turn and the relative positions of the different reactors in the series varies, unequal loss of fluorine from different reactors will be automatically evened out and fluorine is preferably introduced in amount approximately equivalent to the calculated loss into the particular reactor which is at any given time withdrawn from the system for regeneration.

The average percent molar water content of the recycle gas may be determined by carrying out gravimetric determinations of the water content of the recycle gas at regular intervals during the process period. At the end of a run the average of these determinations is calculated as the arithmetic mean of all the results.

The invention is illustrated by the following example.

A commercially operating "Platforming" unit was operated for 7,552 hours on stream with an average water content of the recycle gas of 0.022% mol. By substitution in the formula $$\text{Fluorine loss (percent wt.)} = 2.22 \times \sqrt{\text{Average percent molar water content of recycle gas} \times \text{hours on stream.}}$$

the fluorine loss was calculated to be 28%. Subsequent chemical analysis confirmed this figure and also indicated a 56% by weight chlorine loss and a deposit of 3.24% wt. carbon. The total catalyst was divided into several portions which were regenerated and treated to restore halogen in different ways for comparison.

The regeneration conditions were the same in all cases viz: the catalyst was maintained in a reactor at about 800° F. and atmospheric pressure while a nitrogen air mixture containing 2% by volume of oxygen was passed through at 900 v./v./hr. calculated at STP.

The conditions for the treatment to restore halogen were also kept the same and were as follows: An organic halide was dissolved in a 0.1% wt. concentration in a 100–200° C. boiling range naphtha fraction. This solution, which was stored at −10° C. to prevent evaporation of the halide, was then fed while still cold and without any prior heating into a heated reactor containing the spent catalyst. The space velocity was 2 v./v./hr. and the rehalogenation period 2 hrs. The reactor temperature was 868° F. and the pressure 500 p.s.i.g., maintained with once-through hydrogen.

After regeneration and rehalogenation, the catalyst was subjected to an activity test to determine the effectiveness of the treatments. In this test a 100–200° C. boiling range naphtha is passed over the catalyst together with hydrogen under the following conditions:

Catalyst charge _____ 60 ml.
Average catalyst temperature _ 860° F.
Naphtha feed space velocity __ 2 vol. feed/vol catalyst/hr.
Hydrogen/hydrocarbon mol ratio _____ 3/1.
Reactor pressure _____ 500 p.s.i.g.
Duration _____ 20 hours.

The product from the reactor is debutanised and the octane number, volatility, refractive dispersion, and specific gravity determined.

The results are set out in Table 1 below and the runs are numbered 1 to 8.

Table 1

| Catalyst | | Chemical Analysis | | | Activity Test | | | |
|---|---|---|---|---|---|---|---|---|
| Run No. | Description and/or Method of Rehalogenation | Percent wt. of material stable at 900° C. | | Percent weight as received carbon | ON Research Clear | D+L at 100° C., percent vol. | Dispersion | Specific Gravity at 60° F./60° F. |
| | | Fluorine | Chlorine | | | | | |
| 1 | Fresh | 0.5 | 0.25 | | 85.6 | 18.0 | 109 | |
| 2 | Used, blend from reactors 1, 2 and 3 | 0.36 | 0.11 | 3.24 | 74.7 | 10.7 | 102 | 0.7808 |
| 3 | Used, regenerated | 0.36 | 0.11 | 0.1 | 79.4 | 10.0 | 108 | 0.7840 |
| 4 | Used, regenerated, and rehalogenated with tert-butyl fluoride. | 0.67 | 0.11 | 0.1 | 87.0 | 28.0 | 110.0 | 0.7766 |
| 5 | Used, regenerated, and rehalogenated with tert-butyl fluoride and tert-butyl chloride. | 0.41 | 0.27 | 0.1 | 85.3 | 23.5 | 111.0 | 0.7820 |
| 6 | Used, regenerated, and rehalogenated with dichlorodifluoromethane. | 0.46 | 0.525 | 0.1 | 87.8 | 27.5 | 109.5 | 0.777 |
| 7 | Used, regenerated, and rehalogenated with dichlorodifluoromethane. Preheater used. | 0.38 | 0.37 | 0.1 | 78.3 | 20.5 | 103 | 0.7728 |
| 8 | Used, reactivated with tert-butyl fluoride and tert-butyl chloride and then regenerated. | 0.44 | 0.44 | 0.1 | 87.0 | 23.5 | 110.5 | 0.7809 |

Runs 1 and 2 show the drop in halogen content and in activity between fresh and used catalyst, and run 3 shows that regeneration alone is not sufficient to restore the catalyst activity to its original level. In run 4 the catalyst has been regenerated and refluorinated to a fluorine content above the original level. This additional fluorine has more than compensated for the chlorine which has been lost and not replaced, as shown by the higher octane number of the product of the activity test. Alternatively, in runs 5 and 6 both fluorine and chlorine have been replaced and the activity of the catalyst has been restored. In run 5 a mixture of tert-butyl fluoride and tert-butyl chloride was used; in run 6 a single compound containing both chlorine and fluorine. Run 7 indicates the effect of preheating the solution containing the organic halogen compound before it enters the reactor. As compared with run 6 less halogen is replaced on the catalyst with a consequent drop in the catalyst activity. Run 8 shows that rehalogenation followed by regeneration is equally as effective as regeneration followed by rehalogenation.

We claim:

1. In the reforming of a petroleum fraction by contacting the fraction in a reaction zone with a fixed bed catalyst consisting essentially of platinum, alumina, and 0.1–8% combined halogen by weight of alumina at the start of a given processing period, said halogen being at least 0.1–3% fluorine, at elevated temperature and pressure, and in the presence of hydrogen, with recycle of gas to said reaction zone but without the introduction of halogen into the reaction zone during said processing period, which catalyst has lost fluorine during the processing period, the improvement of adjusting the fluorine content of the catalyst within the range of 0.1–8% at the completion of said given processing period which comprises, obtaining the average percent molar water content of the recycle gas and the hours on stream during the given processing period, determining the precise fluorine loss during said given processing period according to the equation $$\text{Fluorine loss (percent wt.)} = 2.22 \times \sqrt{\text{Average percent molar water content of recycle gas} \times \text{hours on stream}}.$$

and adding to the catalyst in situ in said reaction zone, a substance selected from the group consisting of fluorine and a fluorine-containing compound which is reactable with the alumina and in an amount sufficient to restore the fluorine content to a given value within the range 0.1–8%.

2. In the reforming of a petroleum fraction according to the process of claim 1, in which the fixed bed catalyst consists essentially of platinum, alumina and 0.1–8% combined fluorine by weight of alumina at the start of a given processing period.

3. A process according to claim 1 in which fluorine is introduced between processing periods in an amount in excess of that lost during processing.

4. A process according to claim 1 in which fluorine is introduced between processing periods in an amount substantially equivalent to that lost during processing, together with chlorine, if the catalyst originally contained chlorine.

5. A process as claimed in claim 1 which is carried out in conjunction with and before a regeneration process for the removal of carbonaceous deposits.

6. A process as claimed in claim 1 which is carried out in conjunction with and after a regeneration process for the removal of carbonaceous deposits.

7. A process as claimed in claim 1 wherein the fluorine is introduced between processing periods into a reactor at elevated temperature as an organic fluorine compound dissolved in a liquid hydrocarbon fraction boiling within the gasoline or naphtha range.

8. A process as claimed in claim 7 wherein the liquid hydrocarbon fraction is not preheated and is introduced into reactor which is at 800 to 900° F.

References Cited in the file of this patent

UNITED STATES PATENTS

| 2,816,857 | Hemminger | Dec. 17, 1957 |
| 2,916,440 | Hogin et al. | Dec. 8, 1959 |

UNITED STATES PATENT OFFICE

CERTIFICATE OF CORRECTION

Patent No. 3,030,301                                                  April 17, 1962

Peter Thomas White et al.

It is hereby certified that error appears in the above numbered patent requiring correction and that the said Letters Patent should read as corrected below.

Column 6, line 24, for "Yuorine-containing" read -- fluorine-containing --.

Signed and sealed this 14th day of August 1962.

(SEAL)
Attest:

ERNEST W. SWIDER
Attesting Officer

DAVID L. LADD
Commissioner of Patents